United States Patent
Bhandari et al.

(10) Patent No.: US 12,407,739 B2
(45) Date of Patent: Sep. 2, 2025

(54) INTERCONNECTION BORDER CONTROL FUNCTION AND HOME SUBSCRIBER SERVER INTERFACE FOR MANAGING VOICE CALLS

(71) Applicant: T-Mobile USA, Inc., Bellevue, WA (US)

(72) Inventors: Chandrashekhar Bhandari, Bellevue, WA (US); Homer Nicolas Filart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 344 days.

(21) Appl. No.: 17/962,173

(22) Filed: Oct. 7, 2022

(65) Prior Publication Data

US 2024/0121277 A1 Apr. 11, 2024

(51) Int. Cl.
*H04L 65/1016* (2022.01)
*H04L 65/1069* (2022.01)
*H04W 8/04* (2009.01)

(52) U.S. Cl.
CPC ...... *H04L 65/1016* (2013.01); *H04L 65/1069* (2013.01); *H04W 8/04* (2013.01)

(58) Field of Classification Search
CPC ............. H04L 65/1016; H04L 65/1069; H04L 65/1063; H04L 65/1073; H04L 65/1104; H04W 8/04
See application file for complete search history.

(56) References Cited

U.S. PATENT DOCUMENTS

| | | |
|---|---|---|
| 7,301,934 B1 | 11/2007 | Casati et al. |
| 7,330,453 B1 | 2/2008 | Borella et al. |
| 7,640,036 B2 | 12/2009 | Kallio |

(Continued)

FOREIGN PATENT DOCUMENTS

| | | |
|---|---|---|
| CN | 101212356 B | 5/2011 |
| CN | 102202283 A | 9/2011 |

(Continued)

OTHER PUBLICATIONS

English Translation—WO2013097179A.cn_MT (Year: 2013).*

(Continued)

*Primary Examiner* — Sun Jong Kim
(74) *Attorney, Agent, or Firm* — Perkins Coie LLP

(57) ABSTRACT

An internet protocol (IP) multimedia core subsystem (IMS) of a telecommunications network includes an interconnection border control function (IBCF). The system can receive a request to connect a particular voice call or messaging over a voice over IP (VoIP) network. In response to the request, the IBCF can send a location information request (LIR) to a home subscriber server (HSS) of the telecommunications network. The HSS and the IBCF can be in direct communication with each other via an HSS/IBCF interface. The LIR can include a request for a subscriber status associated with a user associated with a terminating device. The IBCF can receive a location information answer (LIA) from the HSS. The LIA can indicate whether the user is a subscriber of the telecommunications network. In response to receiving the LIA, the system can determine whether to allow the IMS to establish a session for the particular voice call.

18 Claims, 4 Drawing Sheets

(56) References Cited

U.S. PATENT DOCUMENTS

| | | |
|---|---|---|
| 7,715,370 B2 | 5/2010 | Gourraud |
| 7,738,426 B2 | 6/2010 | Smith et al. |
| 7,761,600 B2 | 7/2010 | Terrill et al. |
| 7,843,903 B2 | 11/2010 | Bakke et al. |
| 7,920,529 B1 | 4/2011 | Mahler et al. |
| 7,936,683 B2 | 5/2011 | Qiu et al. |
| 7,962,120 B2 | 6/2011 | Cai et al. |
| 7,983,228 B1 | 7/2011 | Choksi |
| 8,112,523 B2 | 2/2012 | Van et al. |
| 8,165,063 B2 | 4/2012 | Kim et al. |
| 8,166,129 B2 | 4/2012 | Gourraud |
| 8,185,104 B2 | 5/2012 | Walker et al. |
| 8,213,411 B2 | 7/2012 | Ayers et al. |
| 8,218,531 B2 | 7/2012 | Qiu et al. |
| 8,250,634 B2 | 8/2012 | Agarwal et al. |
| 8,260,258 B1 | 9/2012 | Li et al. |
| 8,279,798 B2 | 10/2012 | Preiss et al. |
| 8,295,158 B2 | 10/2012 | Li et al. |
| 8,305,983 B2 | 11/2012 | Siegel et al. |
| 8,316,457 B1 | 11/2012 | Paczkowski et al. |
| 8,359,015 B2 | 1/2013 | Swaminathan et al. |
| 8,369,313 B2 | 2/2013 | Lu et al. |
| 8,374,173 B2 | 2/2013 | Sedlacek et al. |
| 8,406,183 B2 | 3/2013 | Siegel et al. |
| 8,422,405 B2 | 4/2013 | Ho |
| 8,457,631 B2 | 6/2013 | Choksi et al. |
| 8,483,182 B1 | 7/2013 | Keller et al. |
| 8,494,521 B2 | 7/2013 | Shi |
| 8,495,226 B2 | 7/2013 | Lau |
| 8,514,870 B2 | 8/2013 | Ma et al. |
| 8,520,664 B2 | 8/2013 | Betti et al. |
| 8,543,107 B1 | 9/2013 | Bertz et al. |
| 8,644,218 B1 | 2/2014 | Pankajakshan et al. |
| 8,656,032 B2 | 2/2014 | Ren et al. |
| 8,693,464 B2 | 4/2014 | Ku et al. |
| 8,750,839 B1 | 6/2014 | Paczkowski et al. |
| 8,750,869 B2 | 6/2014 | Lee et al. |
| 8,761,764 B2 | 6/2014 | Mccann et al. |
| 8,782,208 B2 | 7/2014 | Belinchon Vergara et al. |
| 8,805,361 B2 | 8/2014 | Kieselmann et al. |
| 8,811,282 B2 | 8/2014 | Boulos et al. |
| 8,837,444 B2 | 9/2014 | Noldus |
| 8,855,023 B2 | 10/2014 | Mutikainen et al. |
| 8,861,536 B2 | 10/2014 | Xu et al. |
| 8,908,665 B2 | 12/2014 | Alriksson |
| 8,918,518 B2 | 12/2014 | Xue et al. |
| 8,934,461 B2 | 1/2015 | Leis et al. |
| 8,966,034 B1 | 2/2015 | Paczkowski et al. |
| 8,995,318 B2 | 3/2015 | Atarius et al. |
| 9,019,954 B2 | 4/2015 | Merino Vazquez et al. |
| 9,021,014 B2 | 4/2015 | Agarwal et al. |
| 9,026,675 B2 | 5/2015 | Merino Vazquez et al. |
| 9,154,526 B2 | 10/2015 | Jackson et al. |
| 9,173,184 B2 | 10/2015 | Hwang |
| 9,185,141 B2 | 11/2015 | Perkuhn et al. |
| 9,219,759 B2 | 12/2015 | Zisimopoulos et al. |
| 9,247,418 B2 | 1/2016 | Lau |
| 9,294,906 B2 | 3/2016 | Kim et al. |
| 9,408,064 B2 | 8/2016 | Zou et al. |
| 9,413,618 B2 | 8/2016 | Martinez Perea et al. |
| 9,479,600 B2 | 10/2016 | Cecilia Torralba et al. |
| 9,584,551 B2 | 2/2017 | Chiduruppa et al. |
| 9,654,964 B1 | 5/2017 | Carames et al. |
| 9,674,750 B2 | 6/2017 | Keller et al. |
| 9,769,646 B2 | 9/2017 | Mufti et al. |
| 9,794,302 B2 | 10/2017 | Noldus et al. |
| 9,794,776 B2 | 10/2017 | Noldus |
| 9,819,703 B2 | 11/2017 | Chiang |
| 10,009,747 B2 | 6/2018 | Balabhadruni et al. |
| 10,021,738 B1 | 7/2018 | Mehta et al. |
| 10,244,004 B2 | 3/2019 | Hockey et al. |
| 10,298,625 B2 | 5/2019 | Noldus |
| 10,681,556 B2 | 6/2020 | Filart |
| 10,708,318 B2 | 7/2020 | Qiao et al. |
| 10,791,496 B2 | 9/2020 | Jahangir et al. |
| 10,848,525 B2 | 11/2020 | Patil et al. |
| 11,165,833 B2 | 11/2021 | Corona et al. |
| 11,166,327 B1 | 11/2021 | Kondeti et al. |
| 11,394,752 B2 | 7/2022 | Al-mehdar et al. |
| 2005/0015499 A1 | 1/2005 | Mayer |
| 2006/0239267 A1 | 10/2006 | Ryu |
| 2006/0253538 A1 | 11/2006 | Jung et al. |
| 2007/0021118 A1 | 1/2007 | Ophir |
| 2007/0121584 A1* | 5/2007 | Qiu ............ H04N 7/173 370/352 |
| 2007/0266085 A1 | 11/2007 | Rajko et al. |
| 2008/0215736 A1 | 9/2008 | Astrom et al. |
| 2008/0219241 A1 | 9/2008 | Leinonen et al. |
| 2009/0041223 A1 | 2/2009 | Agarwal et al. |
| 2009/0089434 A1 | 4/2009 | Creamer et al. |
| 2009/0089435 A1 | 4/2009 | Terrill et al. |
| 2009/0103518 A1 | 4/2009 | Yu et al. |
| 2009/0303875 A1 | 12/2009 | Matsumura |
| 2010/0050234 A1 | 2/2010 | Lindholm et al. |
| 2010/0153563 A1* | 6/2010 | Ku ............. H04L 65/1016 709/228 |
| 2010/0208671 A1 | 8/2010 | Tamura et al. |
| 2010/0217875 A1 | 8/2010 | Belinchon et al. |
| 2010/0223326 A1 | 9/2010 | Noldus et al. |
| 2010/0293593 A1 | 11/2010 | Lindholm et al. |
| 2011/0103372 A1* | 5/2011 | Shatsky ........ H04L 65/1045 370/352 |
| 2011/0125925 A1 | 5/2011 | Bouthemy et al. |
| 2011/0319054 A1* | 12/2011 | Cutler .......... H04M 15/66 455/406 |
| 2012/0069840 A1 | 3/2012 | Zhu et al. |
| 2013/0100863 A1 | 4/2013 | Guerra et al. |
| 2013/0322344 A1 | 12/2013 | Li et al. |
| 2015/0043453 A1 | 2/2015 | Hegarty et al. |
| 2015/0222753 A1 | 8/2015 | Noldus |
| 2015/0282242 A1 | 10/2015 | Merino et al. |
| 2016/0374005 A1* | 12/2016 | Cho ............ H04L 65/1045 |
| 2017/0142777 A1* | 5/2017 | Vuppala ........ H04W 76/27 |
| 2020/0145465 A1* | 5/2020 | Al-Mehdar ...... H04L 12/1881 |
| 2021/0136634 A1 | 5/2021 | Bakker et al. |
| 2022/0022272 A1 | 1/2022 | Kondeti |
| 2022/0046097 A1* | 2/2022 | Noldus ......... H04L 65/1069 |
| 2022/0239704 A1* | 7/2022 | Yuan ............ H04L 65/80 |

FOREIGN PATENT DOCUMENTS

| | | | |
|---|---|---|---|
| CN | 101917696 B | | 4/2013 |
| CN | 107135132 A | * | 9/2017 |
| CN | 112565168 A | | 3/2021 |
| CN | 109982319 B | | 5/2022 |
| EP | 1869841 B1 | | 12/2009 |
| EP | 2372966 A1 | | 10/2011 |
| EP | 1936923 B1 | | 5/2012 |
| EP | 2583428 B1 | | 6/2014 |
| EP | 2079215 B1 | | 7/2016 |
| EP | 2922316 B1 | | 5/2017 |
| EP | 3337118 B1 | | 4/2020 |
| KR | 100419578 B1 | | 2/2004 |
| KR | 20060113284 A | | 11/2006 |
| KR | 100703426 B1 | | 4/2007 |
| KR | 20080069881 A | | 7/2008 |
| KR | 20140057764 A | | 5/2014 |
| KR | 101454764 B1 | | 11/2014 |
| KR | 101520811 B1 | | 5/2015 |
| KR | 101528675 B1 | | 6/2015 |
| KR | 20150095441 A | | 8/2015 |
| KR | 101730726 B1 | | 4/2017 |
| KR | 20190120951 A | | 10/2019 |
| KR | 102273762 B1 | | 7/2021 |
| WO | 2007147357 A1 | | 12/2007 |
| WO | 2008046266 A1 | | 4/2008 |
| WO | 2009015532 A1 | | 2/2009 |
| WO | 2010081339 A1 | | 7/2010 |
| WO | 2010139279 A1 | | 12/2010 |
| WO | 2011038691 A1 | | 4/2011 |
| WO | 2011157093 A1 | | 12/2011 |
| WO | 2012003763 A1 | | 1/2012 |
| WO | 2013000398 A1 | | 1/2013 |

(56) References Cited

FOREIGN PATENT DOCUMENTS

| WO | WO-2013097179 A1 | * | 7/2013 | ............ H04L 12/16 |
|----|------------------|---|--------|--------------------------|
| WO | 2015007310 A1    |   | 1/2015 |                          |
| WO | 2016062008 A1    |   | 4/2016 |                          |
| WO | 2020064117 A1    |   | 4/2020 |                          |
| WO | 2020200577 A1    |   | 10/2020 |                         |
| WO | 2021044271 A1    |   | 3/2021 |                          |
| WO | 2021110289 A1    |   | 6/2021 |                          |

OTHER PUBLICATIONS

English translation to Shang et al (CN 107135132) (Year: 2016).*
Huawei et al., BusTI Alternative for eIBCF architecture, S2-124461, SA WG2 Meeting #94, New Orleans, USA, Nov. 6, 2012, pp. 2-4 and figure 6.2.x.2.
International Searching Authority, International Search Report and Written Opinion, PCT Patent Application PCT/US2023/033274, mailed Jan. 18, 2024, 10 pages.

* cited by examiner

INTERCONNECTION BORDER CONTROL FUNCTION AND HOME SUBSCRIBER SERVER INTERFACE FOR MANAGING VOICE CALLS

BACKGROUND

Voice over internet protocol (VoIP) refers to technologies for delivering voice calls and multimedia services over Internet Protocol (IP) networks (e.g., the Internet). The IP multimedia services can include voice calls, videos, and text messaging. In VoIP, digital information including such multimedia can be transmitted as network communications protocol IP packets over the Internet. An IP packet refers to a small amount of data sent, for example, over Transmission Control Protocol (TCP) or User Datagram Protocol (UPD) transport layer.

The VoIP communications can be managed by an IP multimedia core subsystem (IMS) of a telecommunications network. The IMS includes a standardized architectural framework for delivering IP multimedia services. For example, the IMS can manage VoIP calls that originated from peering telecommunications networks and are to be terminated in the telecommunications network associated with the IMS. The IMS can include an interconnection border control function (IBCF) which is configured to control communications between the IMS and the peering networks. For example, the IBCF can receive voice call requests and messaging (e.g., Rich Communication Services (RCS) messaging) from wireless devices in the peering networks and forward the requests to the IMS.

BRIEF DESCRIPTION OF THE DRAWINGS

Detailed descriptions of implementations of the present technology will be described and explained through the use of the accompanying drawings.

Figure 1:
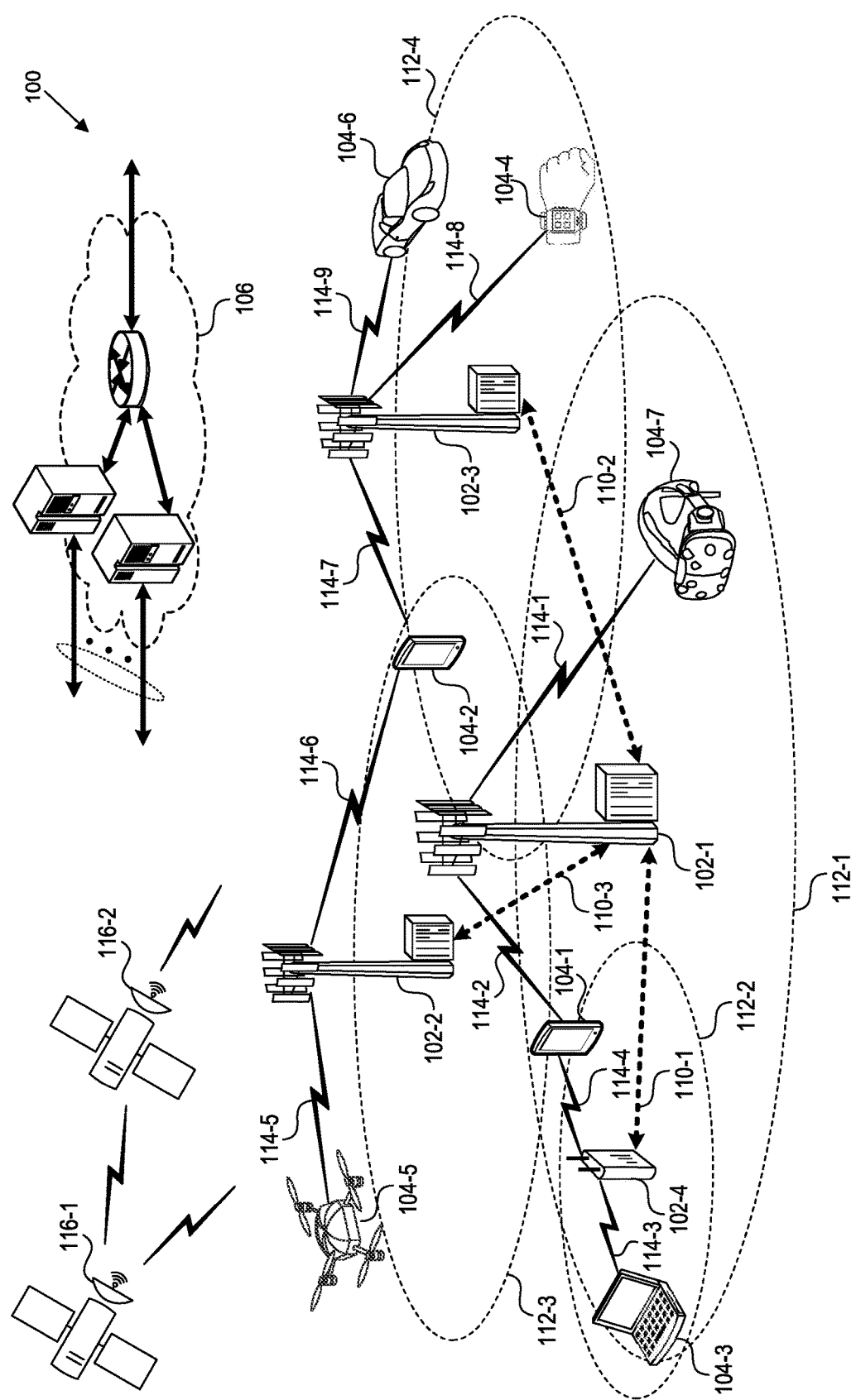
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Overview

The disclosed technology relates to a telecommunications system for managing VoIP communications. The system can include an IP multimedia core subsystem (IMS) including an interconnection border control function (IBCF) and a home subscriber server (HSS). The IBCF is configured to control communications between the IMS and peering telecommunications networks. The IMS is configured to establish voice calls and messaging (e.g., RCS messaging) upon requests received from devices (e.g., wireless and/or landline devices) in peering networks. The HSS is configured to store and provide details of subscribers of the telecommunications network to other entities within the telecommunications system.

In particular, the systems of the present disclosure include an interface between the IBCF and the HSS (referred to as an IBCF/HSS interface) that allows direct communication between the IBCF and the HSS. The IBCF/HSS interface allows the IBCF to request and receive subscriber information from the HSS. The IBCF can thereby, upon receiving a voice call or a messaging request from an originating device and prior to forwarding the request to the IMS to be connected, determine whether the terminating device is associated with a subscriber of the telecommunications system. Such determination can allow the IBCF to block calls terminating to devices that are not associated with a subscriber of the telecommunications system prior to sending the request to the IMS. Such blocking can be used, for example, to avoid overloading the IMS. The disclosed technology can therefore help to ensure that calls received to subscribers of the telecommunications network can be established even when the IMS is at risk of being overloaded.

In one example, a system includes an IBCF coupled to an IMS of a telecommunications network. The system can receive, via a network-to-network interface (NNI) subsystem, a request to connect a particular VoIP network. The particular voice and messaging call can be received by the IBCF over a peering network from a device associated with a first user. The particular voice and messaging call is to be connected to a terminating device. In response to the request, the IBCF can send a location information request (LIR) (e.g., a diameter message including an LIR) to an HSS of the telecommunications network. The HSS and the IBCF can be in direct communication with each other via an HSS/IBCF interface. The HSS can store subscriber status information for multiple subscribers of the telecommunications network. The LIR can include a request for a subscriber status associated with a second user associated with the terminating device. The IBCF can receive a location information answer (LIA) from the HSS. The LIA can indicate, based on the subscriber status, whether the second user is a subscriber of the telecommunications network. In response to receiving the LIA, the system can determine whether to allow the IMS to establish a session for the particular voice call.

In another example, a computer-implemented method for connecting voice call requests from devices received via VoIP to an IMS of a telecommunications network includes receiving a request to connect a particular voice call over a VoIP network via an NNI subsystem. The particular voice call can be received from an originating device associated with a first user and be connected to a terminating device. In response to the request, the method can include sending an LIR by an IBCF to an HSS of the telecommunications network. The HSS and the IBCF can be in direct communication with each other via an HSS/IBCF interface. The LIR includes a request for a subscriber status associated with a second user associated with the terminating device. The method can include receiving a LIA by the IBCF from the HSS. The LIA indicates, based on the subscriber status associated, whether the second user is a subscriber of the telecommunications network. In response to receiving the LIA, the IBCF can determine whether to allow the IMS to establish a session for the particular voice call.

In yet another example, a system includes an HSS of a telecommunications network and an IMS including an IBCF. The system can send, by the IBCF to the HSS via an HSS/IBCF interface, a LIR in response to receiving a request from an originating device to connect a particular voice call over a VoIP network to a terminating device. The HSS and the IBCF are in direct communication with each other via the HSS/IBCF interface. The LIR includes a request for a subscriber status associated with the terminating device. The system can receive a request to connect a particular VoIP network from the device. In response to the request, the IBCF can send to the HSS an LIR via an HSS/IBCF interface. The HSS and the IBCF can be in direct communication with each other via the HSS/IBCF interface. The LIR includes a request for a subscriber status associated with the terminating device. The IBCF can receive from the HSS, via the HSS/IBCF interface, an LIA. The LIA indicates, based on the subscriber status associated with the terminating device, whether voice calls or messaging to the terminating device are authorized. In response to receiving the LIA, the system can determine whether to allow the IMS to establish a session for the particular voice call.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.
Wireless Communications System FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, a radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

VoIP Calling Systems

Figure 2:
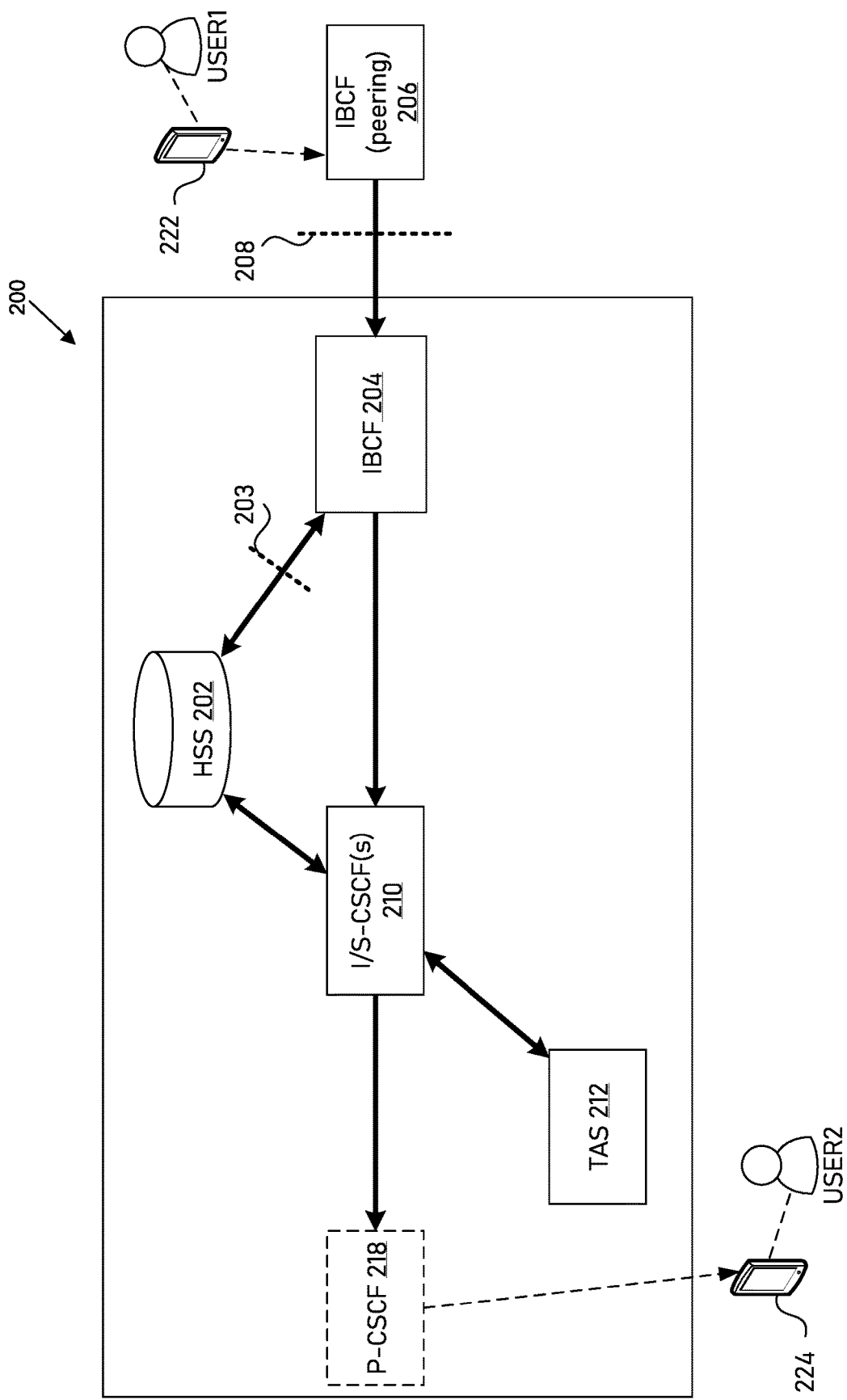
FIG. 2 is a block diagram that illustrates a system for connecting inter service provider voice calls over a VoIP network.

FIG. 2 is a block diagram that illustrates an IMS 200 for connecting inter service provider voice calls and/or messaging over a VoIP network. The messaging can include, for example, RCS messaging. The RCS messaging (also known as a real-time chat) can include messaging through a protocol allowing messaging with enhanced features including transmitting in-call multimedia, phonebook polling, personalized alerts, reminders, notifications, etc. The IMS 200 is associated with a telecommunications network service provider (e.g., a service provider for the VoIP network). The IMS 220 includes an IBCF 204, an HSS 202 and one or more serving call session control functions (S-CSCFs) and optionally one or more interrogating call session control functions (I-CSCF) (e.g., referred to as US-CSCFs 210 in FIG. 2).

The IMS 200 is in communication with peering networks (e.g., VoIP networks of service providers that are different from the service provider associated with the IMS 200) that connect to each other via IBCFs (e.g., the IBCF 204 of the IMS 200 and an IBCF 206 of a system associated with a peering network). The IBCF 206 can operate as a boundary control element that controls communications between different service provider networks. For example, the IBCFs 204 can include a session border controller (SBC) function which is regarded as part of the IMS 200. In some implementations, the peering networks (e.g., including systems other than IMS) communicate with the IMS 200 via SBCs.

The IBCF 204 is configured to control communications between the IMS 220 and other networks (e.g., VoIP networks of different service providers). The IBCF 204 can receive voice call or messaging requests from devices and either allow establishing the voice calls or messaging by forwarding the requests to the IMS 220 or block the voice calls or messaging by forgoing sending the requests to the IMS 220. The SBC can receive the requests originated by devices (e.g., a device 222 associated with a user 1) from peering telecommunications networks via an NNI (e.g., an NNI 208) to be connected to terminal devices (e.g., a device 224). The devices 222 and 224 can be wireless or landline devices. For example, the devices 222 and 224 are mobile phones, as illustrated in FIG. 2. As another example, the devices 222 and 224 are other types of wireless devices (e.g., wireless devices 104-2 through 104-7 described with respect to FIG. 1) or landline devices (e.g., landline phones). The NNI 208 is configured to enable connecting voice calls or messaging by defining inter signaling and management processes for the VoIP network.

As an example, in FIG. 2, user 1 originates a voice call or a messaging request on the device 222 (e.g., a mobile phone). The voice call or messaging is to be connected with (or terminated at) a device 224 (e.g., a mobile phone) associated with user 2. The users 1 and 2 can be subscribers of different service providers of VoIP networks and thereby the devices 222 and 224 can be associated with different (e.g., peering) telecommunications networks that connect to each other via the IBCF 206. The voice call or messaging request from the device 222 is forwarded by the IBCF 206 to the NNI 208 of the IMS 200. The NNI 208 further forwards the request for the voice call or the messaging to the IBCF 204.

In accordance with the present technology, the IBCF 204 can determine whether a voice call or messaging request from a respective device should be established based on the subscriber status of a user of the terminating device associated with the voice call or messaging request. The IBCF 204 can send or forgo sending the request to the IMS 220 accordingly. Determining whether the voice call or messaging request from a device should be established can include determining whether a user associated with the terminating device (e.g., user 2 associated with the terminating device 224) is a subscriber of the telecommunications network associated with the IMS 200. The determining can be performed by requesting a subscriber status of the user from the HSS. The HSS 202 includes a subscriber database associated with the IMS 200 which stores and provides details of the subscribers of the telecommunications network to other entities within the IMS 200. The HSS 202 can store and provide, for example, subscriber information associated with users subscribed to the telecommunications network. The subscriber information can include information about subscribers' wireless plans. A wireless plan refers to a service and billing agreement between a subscriber and telecommunications network that allows the subscriber to, for example, make and receive voice calls and messages and access the Internet via cellular data. The subscriber information is associated with particular devices. For example, a mobile phone is associated with a particular phone number that a user of the mobile phone can use for making and receiving voice calls and messages.

The IBCF 204 of the IMS 200 includes an HSS/SBC interface (e.g., an HSS/SBC interface 203) that enables direct communication between the HSS 202 and the IBCF 204. The IBCF 204 can send requests to, and receive responses from, the HSS 202 via the HSS/SBC interface 203. For example, upon receiving the request for a VoIP voice call or messaging from the device 222, the IBCF 204 can request information from the HSS 202 regarding the subscriber status of user 2 in order to determine whether the user 2 is a subscriber of the telecommunications network associated with the IMS 200.

In some implementations, the HSS/SBC interface 203 is a diameter interface (or Diameter Protocol interface). A Diameter Protocol refers to an authentication, authorization, and accounting protocol used by computer networks. The Diameter Protocol can define features for performing authentication, authorization, and accounting via the diameter interface. Such features can include packet format, version, message length, commands, identifiers, attribute-value pairs, etc. As an example, the Diameter Protocol can be defined by RFC 6733 and the Diameter Protocol can define the minimum requirements for an AAA protocol. Applications associated with a diameter interface can be extended by the addition of commands and/or attributes. In some implementations, the HSS/SBC interface 203 is a Cx interface that can be used conventionally to connect between CSCF and HSS subsystems of an IMS. In some implementations, the HSS/SBC interface 203 includes a protocol such as HyperText Transfer Protocol (HTTP) or Lightweight Directory Access Protocol (LDAP) instead of the diameter interface.

In some implementations, the IBCF 204 can further determine whether a voice call or a messaging request from a device should be established based on, for example, an overload status of the IMS 220 and/or security and reliability standards (e.g., for determining whether a call is a fraud or scam call). The IBCF 204 can forgo sending the request to the IMS 220 when the SBC determines that the IMS 220 is overloaded or the request call is a fraudulent call. The IBCF 204 can send or forgo sending the request for the voice call or the messaging to the IMS 220 based on a combination of the overload status and the subscriber information.

As shown in FIG. 2, the IBCF 204 is also coupled with the one or more I/S-CSCFs 210 (e.g., a serving voice over long-term evolution (VoLTE) CSCF). It is noted that the S-CSCFs and optional I-CSCFs can operate as separate units or as combined I/S-CSCFs units. In some implementations, the IMS 200 does not include I-CSCF(s) (e.g., the I/S-CSCF (s) 210 can be referred to as S-CSCF(s) 210). A CSCF refers to a central subsystem of an IMS that can, for example, manage all signaling to and from user devices (e.g., managing session initiation protocol (SIP) packages) and controlling communication with other networks such as VoLTE networks. An IMS can include one or more S-CSCFs (e.g., the I/S-CSCFs 210). An S-CSCF is a central signaling node in an IMS configured to perform session control by, for example, receiving requests for voice calls or messaging from the IBCF 204 and establishing the voice call or messaging by sending the requests to a telephony application server (TAS) (e.g., a TAS 212) of the IMS 220 to enable establishing the voice call or messaging. In some implementations, the IMS can include multiple US-CSCFs 210 for load distribution. In such implementations, the HSS 202 can designate devices associated with the service provider (e.g., the device 224) of IMS 200 to respective I/S-CSCFs 210 such that each S-CSCF is associated with multiple devices. For example, when the terminating device registers to the network associated with the IMS 200, the terminating device is associated with a particular S-CSCF of the multiple S-CSCFs. The information of the particular S-CSCF associated with the device is stored in the HSS 202. The IBCF 204 is configured to determine (e.g., by a domain name server (DNS) query) an IP address associated with the terminating device of the voice call or messaging request and send the voice call or messaging request to the particular S-CSCF of the multiple S-CSCF that is associated with the terminating device based on the IP address.

In accordance with the present disclosure, the I-CSCF is an optional unit of the IMS 200. The I-CSCF can be optional such that its function may be implemented by the IBCF for a terminating call in addition to other verification functions as described in this disclosure. The I-CSCF, if used in the network, can follow industry standards.

The IMS 220 further includes the TAS 212 coupled with the I/S-CSCFs 210. The TAS 212 is configured to provide supplementary multimedia services (e.g., telephony applications or additional multimedia functions) between users of the IMS 220. The TAS 212 (as a terminating TAS) can provide such supplementary multimedia services to the terminating devices (e.g., device 224). The TAS 212 can provide, for example, caller identification display, call waiting service, call hold service, call forwarding service, origination/termination denial service (e.g., denying calls based on anonymity or origination location), voice message service, conference calling, and/or missed call service. The S-CSCF 210 that is associated with the terminating device 224 can enable connecting voice calls or messaging with the supplementary multimedia services to the terminating device 224 via the TAS 212.

The IMS 220 can further include other subsystems such as a proxy call session control function (e.g., a P-CSCF 218). The P-CSCF 218 can operate as a first contact point for subscribers of the wireless communications network associated with the IMS 200 (e.g., as an alternative to IBCF 204) to protect the IMS as well as the overall network. As shown in FIG. 2, the terminating device 224 is coupled with the P-CSCF 218. The I/S-CSCF(s) 210 can connect a voice call or messaging to the terminating device 224 by forwarding a request for the voice call or the messaging to the TAS 212. The TAS 212 can further forward the voice call or messaging request to the P-CSCF-218 via the I/S-CSCF(s) 210 which can then communicate the voice call or messaging request to the terminating device 224.

Figure 3:
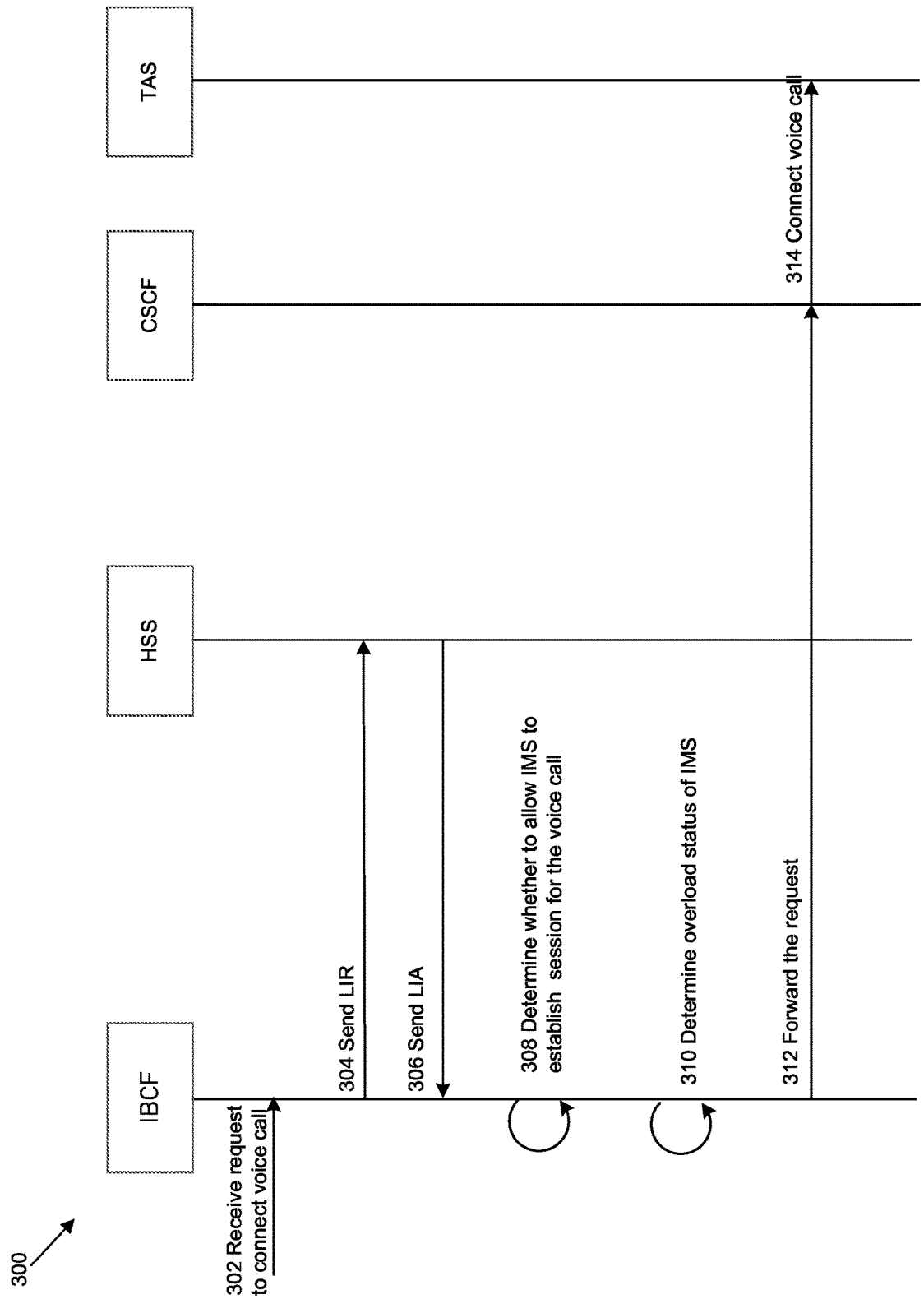
FIG. 3 is a sequence diagram that illustrates processes for connecting inter service provider voice calls over a VoIP network.

FIG. 3 is a sequence diagram that illustrates processes 300 for connecting inter service provider voice calls and/or messaging. The processes 300 can be performed by a system including an IBCF coupled to an IMS of a telecommunications network (e.g., the IMS 200 including the IBCF 204 and the IMS 220 described with respect to FIG. 2). The system can include at least one hardware processor and at least one non-transitory memory storing instruction. When the instructions are executed by the at least one hardware processor, the system can perform the processes 300. For example, the IBCF, the HSS, and/or the IMS includes a computing system 400 described with respect to FIG. 4.

At 302, the IBCF receives a request to connect a voice call or messaging over a VoIP network. The request can be received via an NNI subsystem (e.g., the NNI 208 in FIG. 2) from a peering network. The peering network is, for example, a network associated with a different telecommunications service provider than the network associated with the system (e.g., the IMS 200). For example, the voice call or messaging request is originated from a device associated with the originating device of user 1 in FIG. 2. The voice call or messaging request includes a request to connect a voice call or messaging to the terminating device of user 2. The user 2 and/or the terminating device is associated with the service provider of IMS 200 of the telecommunications network.

At 304, in response to receiving the request, the IBCF can send an LIR to an HSS of the telecommunications network. The HSS and the IBCF can be in direct communication with each other via an HSS/IBCF interface (e.g., the HSS/IBCF interface 203 in FIG. 2). The HSS/IBCF interface can be a Diameter Protocol interface configured to communicatively couple the HSS and the IBCF so that the HSS and the IBCF can transmit information, data, requests, instructions, etc. via the HSS/IBCF interface.

The HSS can store subscriber status information for multiple subscribers of the telecommunications network. For example, the LIR can include a request for a subscriber status associated with the user that indicates whether the user is a subscriber of the telecommunications network that is associated with the system. The subscriber status information can be based on subscribers' wireless plans. A wireless plan refers to a service and billing agreement between a subscriber and telecommunications network that allows the subscriber to, for example, make and receive voice calls and messages and/or access the Internet via cellular data. The subscriber status information can be associated with particular devices. For example, a mobile phone is associated with a particular phone number that a user of the mobile phone can use for calling and receiving voice calls and/or messages. The phone number is further associated with the user's subscriber status information.

At 306, in response to sending the request, the IBCF can receive an LIA from the HSS. The LIA can indicate, based on the subscriber status associated with the user (e.g., user 2 in FIG. 2), whether the user is a subscriber of the telecommunications network. In some implementations, in response to receiving the LIR, the HSS performs a lookup at a subscriber status information database to determine whether the user associated with the device that has sent the request to connect the voice call or messaging (e.g., the originating device) is a subscriber of the telecommunications network. The lookup can include comparing the information identifying the device that has sent the request (e.g., a phone number associated with the originating device) with the identifying information of multiple subscribers in the subscriber status information database. The HSS can generate the LIA based on the performed lookup.

For example, when the HSS can match the wireless number associated with the originating device with a phone number in the subscriber status information database, the HSS determines that the originating device is associated with a subscriber of the service provider of the telecommunications network. When the HSS cannot match the wireless number associated with the originating device with a phone number in the subscriber status information database, the HSS determines that the originating device is not associated with a subscriber of the service provider of the telecommunications network. The HSS then generates the LIA that indicates that the originating device is or is not associated with a subscriber accordingly.

At 308, in response to receiving the LIA, the system can determine whether to allow the IMS to establish a session for the voice call or messaging. In some implementations, the determination of whether to allow the IMS to establish the session for the voice call or messaging includes determining that the user (e.g., a user associated with the terminating device) is a subscriber of the telecommunications network. In such instances, the IBCF can allow the IMS to establish the session for the voice call or messaging. In some implementations, the determination of whether to allow the IMS to establish the session for the voice call or messaging includes determining that the user is not a subscriber of the telecommunications network. In such instances, the IBCF can disallow the IMS from establishing the session for the voice call or messaging.

At 310, the IBCF can also determine an overload status of the IMS. For example, the IBCF 204 checks the overload status (e.g., periodically) of the I/S-CSCF(s) 210 via a DNS query and/or load-balancer platform. The overload status can indicate whether the IMS is available to accept voice calls or messaging. In some implementations, the IMS is allowed to establish the session for the voice call or messaging when the overload status indicates that the IMS is not overloaded. In contrast, the IMS is disallowed from establishing the session for the voice call or messaging when the overload status indicates that the IMS is overloaded.

In some implementations, the IBCF can determine that the IMS is at risk of overloading (e.g., the overload status indicates that the IMS is at risk of overloading). When the IMS is at risk of overloading (e.g., the IMS is using capacity above a certain predefined threshold), the IBCF can allow the IMS to establish the session for the voice call or messaging when the LIA indicates that the user is a subscriber of the telecommunications network despite the risk of overloading, and disallow the IMS from establishing the session for the voice call or messaging when the LIA indicates that the user is not a subscriber of the telecommunications network. By disallowing the voice call or messaging originating from a peering telecommunications network from a device that is associated with a different service provider (e.g., not the service provider of the telecommunications network of IMS 200), the system can mitigate the overload risk by reducing the number of calls forwarded to the IMS. Concurrently, the system can help to ensure that voice calls or messaging originated by the subscribers of the network are connected thereby providing uninterrupted network service to the subscribers.

In some implementations, the IBCF can perform verification on the request to connect the voice call or messaging to determine whether the voice call or messaging is fraudulent. Whether to allow the IMS to establish the session for the voice call or messaging is further determined based on the verification. For example, the IBCF can perform a query to Verification Function (VF) to perform a spam check. For example, the VF can include the intelligence for identifying whether a phone number is associated with a possible scam or fraud. The spam check can include, for example, comparing the phone number associated with the originating device to the intelligence of the VF.

In response to the determination that the IMS is being allowed to establish the session for the voice call or messaging, at 312 the IBCF can allow the IMS to establish the session for the voice call or messaging by forwarding the request to connect the voice call or messaging to a CSCF that is associated with a terminating device of the voice call or messaging.

In some implementations, determining whether to allow the IMS to establish the session for the voice call or messaging includes, when the user associated with the terminating device is a subscriber, selecting a VoLTE CSCF of the IMS (e.g., the S-CSCF 210 of the IMS 220 in FIG. 2) of to establish the session for the voice call or messaging. For example, the IBCF can perform a DNS query to determine an IP address of a CSCF associated with a terminating device of the voice call or messaging (e.g., the terminating device of user 2 in FIG. 2). The system can include multiple CSCF modules (e.g., US-CSCFs 210 in FIG. 2) and each of the multiple CSCF modules can be associated with multiple devices. Allowing the IMS to establish the session for the voice call or messaging includes sending the request to connect the voice call or messaging to the CSCF based on the IP address.

In some implementations, the processes 300 further include connecting the voice call or messaging to a terminating device via a TAS of the system. As described with respect to FIG. 2, a TAS (e.g., the TAS 212) can be configured to provide supplementary multimedia services to the terminating device. The supplementary multimedia services can include caller identification display, call waiting service, call hold service, call forwarding service, origination/termination denial service, voice message service, conference calling, and/or missed call service. The S-CSCF 210 can communicate with a terminating TAS for the voice call or messaging so that the voice call or messaging with the supplementary multimedia services is established between the originating device (e.g., the user 1 in FIG. 2) and the terminating device (e.g., the user 2 in FIG. 2). For example, the I/S-CSCF(s) 210 forwards the request for the voice call or messaging to the TAS 212. The TAS 212 can further forward the voice call or messaging request to the P-CSCF-218 via the I/S-CSCF(s) 210 which can then communicate the voice call or messaging request to the terminating device 224.

Computer System

Figure 4:
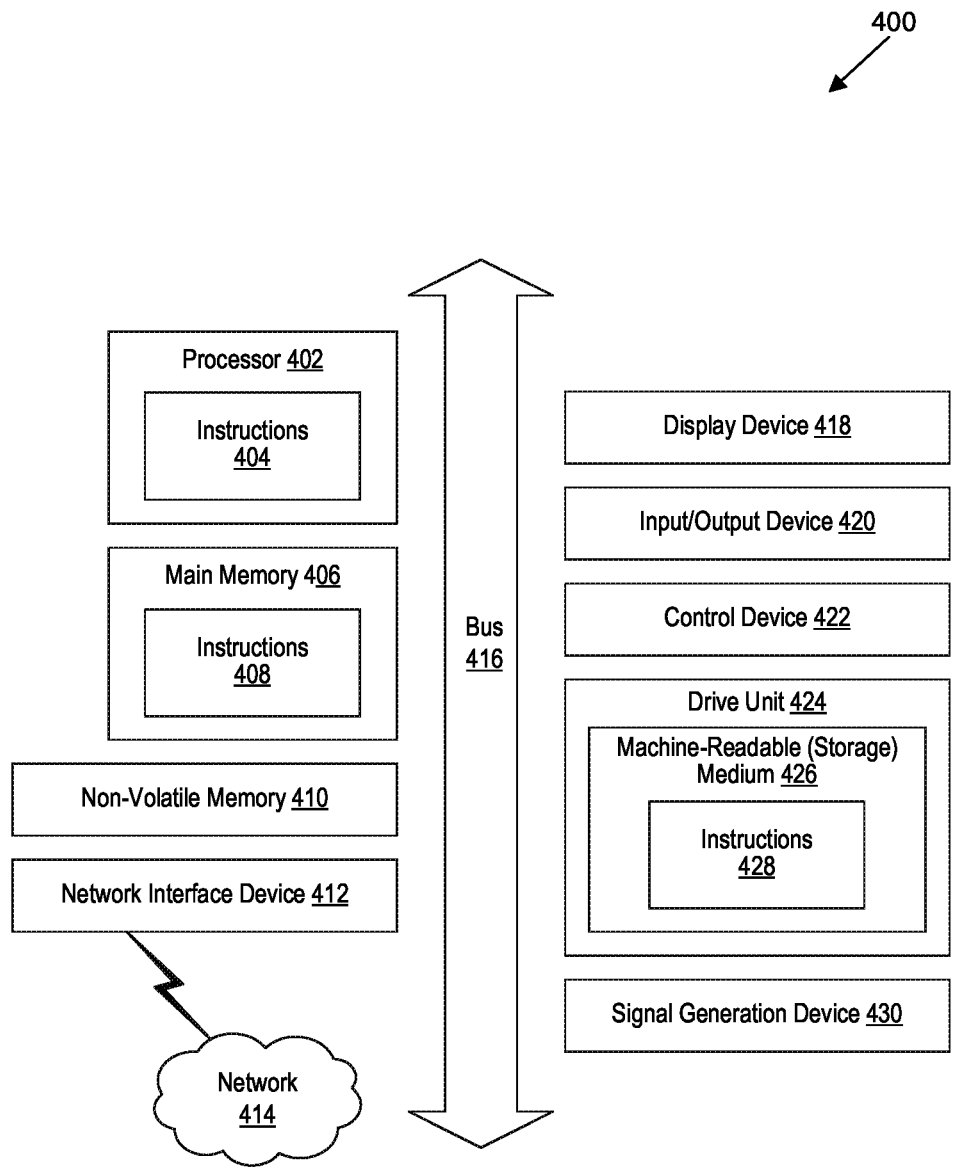
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (IBCF) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system including an internet protocol (IP) multimedia core subsystem (IMS) of a telecommunications network having an interconnection border control function (IBCF), the system comprising:
   at least one hardware processor; and
   at least one non-transitory memory storing instructions, which, when executed by the at least one hardware processor, cause the system to:
      receive, via a network-to-network interface (NNI) subsystem, a request to connect a particular voice call or messaging over a voice over IP (VoIP) network,
         wherein the particular voice call or messaging is received over a peering VoIP network from a device associated with a first user,
         wherein the request to connect the particular voice call is received by the IBCF of the system from a peering IBCF associated with the peering VoIP network, and
         wherein the particular voice call or messaging is to be connected to a terminating device;
      in response to the request, send, by the IBCF, a location information request (LIR) to a home subscriber server (HSS) of the telecommunications network,
         wherein the HSS and the IBCF are in direct communication with each other via an HSS/IBCF interface,
         wherein the HSS/IBCF interface includes a HyperText Transfer Protocol (HTTP) or a Lightweight Directory Access Protocol (LDAP),
         wherein the HSS stores subscriber status information for multiple subscribers of the telecommunications network, and
         wherein the LIR includes a request for a subscriber status associated with a second user associated with the terminating device;
      receive, by the IBCF, a location information answer (LIA) from the HSS,
         wherein the LIA indicates, based on the subscriber status associated with the second user, whether the second user is a subscriber of the telecommunications network; and
      in response to receiving the LIA, determine whether to allow the IMS to establish a session for the particular voice call or messaging.

2. The system of claim 1, wherein to determine whether to allow the IMS to establish the session for the particular voice call or messaging comprises causing the system to:
   determine that the second user is the subscriber of the telecommunications network; and
   select a voice over long-term evolution (VoLTE) Call Session Control Function (CSCF) of the IMS to establish the session for the particular voice call or messaging.

3. The system of claim 1, wherein to determine whether to allow the IMS to establish the session for the particular voice call or messaging comprises causing the system to:
   determine that the second user is the subscriber of the telecommunications network;
   select a Call Session Control Function (CSCF) of the IMS to establish the session for the particular voice call or messaging; and
   cause the CSCF to select a terminating Telephony Application Server (TAS) for the particular voice call or messaging.

4. The system of claim 1, wherein to determine whether to allow the IMS to establish the session for the particular voice call or messaging comprises causing the system to:
   determine that the second user is not the subscriber of the telecommunications network; and
   disallow the IMS from establishing the session for the particular voice call or messaging.

5. The system of claim 1, wherein to determine whether to allow the IMS to establish the session for the particular voice call or messaging comprises causing the system to:
   determine an overload status of the IMS;
      wherein the IMS is allowed to establish the session for the particular voice call or messaging when the overload status indicates that the IMS is not overloaded, and
      wherein the IMS is disallowed from establishing the session for the particular voice call or messaging when the overload status indicates that the IMS is overloaded.

6. The system of claim 1 further caused to:
   determine that the IMS is at risk of overloading; and
   allow the IMS to establish the session for the particular voice call or messaging when the LIA indicates that the second user is the subscriber of the telecommunications network despite the risk of overloading; or
   disallow the IMS from establishing the session for the particular voice call or messaging when the LIA indicates that the second user is not the subscriber of the telecommunications network.

7. The system of claim 1 further caused to:
   perform a verification on the request to connect the particular voice call or messaging to determine whether the particular voice call or messaging is a fraudulent call,
      wherein whether to allow the IMS to establish the session for the particular voice call or messaging is further determined based on the verification.

8. The system of claim 1, further caused to:
   perform a domain name server (DNS) query to determine an IP address of a call session control function (CSCF) associated with the terminating device of the particular voice call or messaging,
      wherein the system includes multiple CSCF modules and each of the multiple CSCF modules is associated with multiple devices, and
      wherein allowing the IMS to establish the session for the particular voice call or messaging includes sending the request to connect the particular voice call or messaging to the particular CSCF based on the IP address.

9. The system of claim 1, further caused to:
   in response to the IMS being allowed to establish the session for the particular voice call or messaging,
      allow the IMS to establish the session for the particular voice call or messaging by forwarding the request to connect the particular voice call or messaging to a particular call session control function (CSCF) that is associated with the terminating device of the particular voice call or messaging.

10. The system of claim 1, wherein allowing the IMS to establish the session for the particular voice call or messaging comprises causing the system to:
connect the particular voice call or messaging to the terminating device via a telephony application server (TAS) of the system,
wherein the TAS is configured to provide supplementary multimedia services to the terminating device.

11. The system of claim 1 further caused to:
in response to sending the LIR to the HSS,
cause the HSS to perform a lookup at a subscriber status information database to determine whether the second user associated with the terminating device is the subscriber of the telecommunications network, and
cause the HSS to generate the LIA based on the performed lookup.

12. A computer-implemented method for connecting voice call or messaging requests from devices received via a voice over IP (VoIP) network to an internet protocol (IP) multimedia core subsystem (IMS) of a telecommunications network, the method comprising:
receiving, via a network-to-network interface (NNI) subsystem, a request to connect a particular voice call or messaging over a voice over IP (VoIP) network,
wherein the particular voice call or messaging is received from an originating device associated with a first user over a peering VoIP network,
wherein the request to connect the particular voice call is received by an interconnection border control function (IBCF) associated with the IMS of the telecommunications network from a peering IBCF associated with the peering VoIP network, and
wherein the particular voice call or messaging is to be connected to a terminating device;
in response to the request, sending, by the IBCF, a location information request (LIR) to a home subscriber server (HSS) of the telecommunications network,
wherein the HSS and the IBCF are in direct communication with each other via an HSS/IBCF interface, and
wherein the HSS/IBCF interface includes a HyperText Transfer Protocol (HTTP) or a Lightweight Directory Access Protocol (LDAP),
wherein the LIR includes a request for a subscriber status associated with a second user associated with the terminating device;
receiving, by the IBCF, a location information answer (LIA) from the HSS,
wherein the LIA indicates, based on the subscriber status associated with the particular user, whether the second user is a subscriber of the telecommunications network; and
in response to receiving the LIA, determine, by the IBCF, whether to allow the IMS to establish a session for the particular voice call or messaging.

13. The method of claim 12, wherein to determine whether to allow the IMS to establish the session for the particular voice call or messaging comprises:
determining that the second user is the subscriber of the telecommunications network; and
selecting a VoLTE CSCF of the IMS to establish the session for the particular voice call or messaging.

14. The method of claim 12, wherein determining whether to allow the IMS to establish the session for the particular voice call or messaging comprises:
determining that the second user is the subscriber of the telecommunications network;
selecting a Call Session Control Function (CSCF) of the IMS to establish the session for the particular voice call or messaging; and
causing the CSCF to select a terminating Telephony Application Server (TAS) for the particular voice call or messaging.

15. The method of claim 12, wherein determining whether to allow the IMS to establish the session for the particular voice call or messaging comprises:
determining that the second user is not the subscriber of the telecommunications network; and
disallowing the IMS from establishing the session for the particular voice call or messaging.

16. A system including a home subscriber server (HSS) of a telecommunications network and an interconnection border control function (IBCF) coupled to an internet protocol (IP) multimedia core subsystem (IMS), the system comprising:
at least one hardware processor; and
at least one non-transitory memory storing instructions, which, when executed by the at least one hardware processor, cause the system to:
receive, via a network-to-network interface (NNI) subsystem, a request to connect a particular voice call or messaging over a voice over IP (VoIP) network,
wherein the particular voice call or messaging is received over a peering VoIP network from an originating device, and
wherein the request to connect the particular voice call is received by the IBCF of the system from a peering IBCF associated with the peering VoIP network, and
wherein the particular voice call or messaging is to be connected to a terminating device;
send, by the IBCF to the HSS via an HSS/IBCF interface, a location information request (LIR) in response to receiving the request,
wherein the HSS and the IBCF are in direct communication with each other via the HSS/IBCF interface,
wherein the HSS/IBCF interface includes a HyperText Transfer Protocol (HTTP) or a Lightweight Directory Access Protocol (LDAP), and
wherein the LIR includes a request for a subscriber status associated with the terminating device;
receive, by the IBCF from the HSS via the HSS/IBCF interface, a location information answer (LIA),
wherein the LIA indicates, based on the subscriber status associated with the terminating device, whether voice call or messaging the particular voice call or messaging is authorized; and
in response to receiving the LIA, determine whether to allow the IMS to establish a session for the particular voice call or messaging.

17. The system of claim 16, wherein:
the HSS stores subscriber status information for multiple subscribers of the telecommunications network, and
the multiple subscribers include a subscriber associated with the terminating device.

18. The system of claim 16 further caused to:
in response to the IMS being allowed to establish the session for the particular voice call or messaging, allow the IMS to establish the session for the particular voice call or messaging by forwarding the request to connect the particular voice call or messaging to a particular call session control function (CSCF) that is associated with the terminating device of the particular voice call or messaging.

* * * * *